US008726115B2

(12) United States Patent
Power et al.

(10) Patent No.: US 8,726,115 B2
(45) Date of Patent: May 13, 2014

(54) UPLINK H-ARQ SIGNALLING MECHANISM IN A WIRELESS COMMUNICATION SYSTEM

(75) Inventors: Kevin Power, West Drayton Middlesex (GB); Mythri Hunukumbure, Hillingdon (GB); Rajni Agarwal, Northwood (GB)

(73) Assignee: Fujitsu Limited, Kawasaki (JP)

( * ) Notice: Subject to any disclaimer, the term of this patent is extended or adjusted under 35 U.S.C. 154(b) by 228 days.

(21) Appl. No.: 12/917,556

(22) Filed: Nov. 2, 2010

(65) Prior Publication Data

US 2011/0113299 A1 May 12, 2011

(30) Foreign Application Priority Data

Nov. 6, 2009 (EP) ...................................... 09175272

(51) Int. Cl.
*G06F 11/00* (2006.01)
(52) U.S. Cl.
USPC .......................................... 714/748; 714/749
(58) Field of Classification Search
USPC ................. 714/748, 749, 750, 751, 752, 753; 370/278, 282
See application file for complete search history.

(56) References Cited

U.S. PATENT DOCUMENTS

| 8,634,404 | B2 | 1/2014 | Morimoto et al. | |
| 2006/0013257 | A1* | 1/2006 | Vayanos | 370/473 |
| 2009/0016266 | A1* | 1/2009 | Kim et al. | 370/328 |
| 2009/0247168 | A1 | 10/2009 | Morimoto et al. | |
| 2011/0044243 | A1* | 2/2011 | Yi et al. | 370/328 |

FOREIGN PATENT DOCUMENTS

| JP | 2007-60177 | 3/2007 |
| WO | 2011/035109 | 3/2011 |

OTHER PUBLICATIONS

Communication pursuant to Article 94(3) EPC dated Mar. 28, 2012, from corresponding European Application No. 09 175 272.5-1237.
Huawei. "HARQ Operation for uplink CoMP" 3GPP TSG RAN WG2 Meeting #67, Aug. 24, 2009.
Alcatel-Lucent Shanghai Bell et al. "Efficient uplink coordinated multi-point reception with reduced backhauling cost" 3GPP TSG RAN WG1 Meeting #57bis, Jun. 29, 2009.
Fujitsu. "UL CoMP HARQ Processing" 3GPP TSG-RAN WG2 Meeting #67bis, Oct. 12, 2009.
"IEEE Standard for Local and Metropolitan Area Networks, Part 16: Air Interface for Fixed and Mobile Broadband Wireless Access Systems, Amendment 2: Physical and Medium Access Control Layers for Combined Fixed and Mobile Operation in Licensed Bands and Corrigendum 1" IEEE Computer Society and the IEEE Microwave Theory and Techniques Society, Feb. 28, 2006.
"Draft Amendment to IEEE Standard for Local and metropolitan area networks, Part 16: Air Interface for Broadband Wireless Access Systems, Advanced Air Interface" IEEE Computer Society and the IEEE Microwave Theory and Techniques Society, Jul. 2009.

(Continued)

*Primary Examiner* — Dieu-Minh Le
(74) *Attorney, Agent, or Firm* — Katten Muchin Rosenman LLP

(57) ABSTRACT

A method in a wireless communication system that includes a user equipment, an anchor network station and at least one assisting network station, where the user equipment transmits the same data to the network stations and the network stations each transmit an acknowledgement of the data to the user equipment in response. The at least one assisting network station also forwards the data to the anchor network station.

14 Claims, 11 Drawing Sheets

(56) References Cited

OTHER PUBLICATIONS

3GPP TS 36.300 V8.12.0 (Mar. 2010) Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), Mar. 2010.

3GPP TS 36.300 V10.1.0 (Sep. 2010) Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), Sep. 2010.

European Search Report dated Jun. 9, 2010, from the corresponding European Application.

Notice of Reasons for Rejection dated Jan. 14, 2014, from corresponding Japanese Application No. 2010-238456.

"Efficient uplink coordinated multi-point reception with reduced backhauling cost" 3GPP TSG RAN WG1 Meeting #58, R1-093345, Aug. 24-28, 2009.

"RAN2 considerations for coordinated multipoint transmission and reception" 3GPP TSG-RAN WG2 Meeting #66, R2-093107, May 4-8, 2009.

* cited by examiner

UPLINK H-ARQ SIGNALLING MECHANISM IN A WIRELESS COMMUNICATION SYSTEM

The present application relates to signalling in wireless communication systems. It has wide application in many communication systems worldwide, particularly but not exclusively in OFDMA, CDMA and other similar systems.

In current CDMA and OFDMA based wireless communication systems such as 802.16e-2005, 802.16m (WiMAX) and 3GPP-LTE, reliability of transmission is ensured using acknowledgements. One common acknowledgement scheme is Automatic Repeat ReQuest (ARQ), in which the receiving terminal requests retransmission of packets that are not correctly decoded. Hybrid ARQ (HARQ) may also be used; this is a simultaneous combination of ARQ and some Forward Error Coding (FEC). Both ARQ and HARQ work by processing received packets and determining if those packets are received with or without errors. For packets received with errors a NACK (Negative ACKnowledgment) control signal is sent to the transmitter to indicate this error. For packets (successfully) decoded by the receiver an ACK (ACKnowledgement) control signal is sent to the transmitter. The transmitter will either retransmit a data packet or send a new data packet depending on the received control signal. Usually when the transmitter receives an ACK, a new data packet is transmitted from the transmission buffer and when a NACK is received a re-transmission of the previously transmitted packet is transmitted to the receiver. When a re-transmission of a packet is received by the receiver it may attempt to combine the new information with the previously unsuccessfully decoded packet in order to now successfully decode the packet. The combination of original and re-transmitted packets (or soft combining) will increase the probability that the packet is decoded successfully.

Typically HARQ is performed in the DL and UL by multiple HARQ processes (stop and wait HARQ channels or time slots acting as transmission opportunities for packets of data) in a HARQ entity (an entity with HARQ enabled). That is, the HARQ process for one data packet can start before the HARQ process for the previous data packet is complete. The use of multiple HARQ processes allows the transmission of data to be continuous and not stop whilst the transmitter is awaiting the transmission of ACK or NACK from the receiver. So for 8 channels there will be 8 time frames (1 . . . 8) in which data can be sent. Thus new data can be sent in 8 consecutive time slots without having to wait for the ACK/NACK signal to be sent back from the receiver to the transmitter.

Typically the receiver can transmit NACK a number of times for a given packet up to a maximum number of transmissions, which is usually pre-defined before the first data packet from a data stream belonging to a service is transmitted.

Hybrid Automatic Repeat Request (H-ARQ) is often used as a mandatory feature for improving robustness against erroneous packets caused for instance by user mobility, channel quality information feedback delays and channel estimation errors. Both IEEE 802.16m (WiMAX) and 3GPP-LTE (Release 8) have adopted similar mechanisms for dealing with H-ARQ re-transmissions. For the downlink, asynchronous H-ARQ is used whereas the uplink uses synchronous H-ARQ. In the synchronous scheme, the re-transmissions for each process occur at pre-defined intervals relative to the original transmission. This scheme therefore allows for a reduction in control signalling overhead, since information such as H-ARQ process number need not be signalled and actually can be inferred from the transmission timing. On the other hand, in the asynchronous scheme, retransmissions can occur at any time relevant to the initial transmission. This flexibility comes at a cost, as explicit signalling is required. That is, the HARQ process number or some other identification is required by the receiver so that it can correctly associate each retransmission with the corresponding initial transmission.

Coordinated Multi Point (CoMP) transmission is a methodology in which data is transmitted from or to several points (communication apparatuses) in a coordinated way, so that the introduced redundancy/diversity can improve system performance. The data generally must be forwarded between the points either before or after transmission. CoMP is one of the technology components considered for the evolution of both LTE and WiMAX. Especially, CoMP is seen as a possible way to further improve the downlink (DL) and uplink (UL) coverage for high data rates and/or low user mobility.

Taking the LTE example and terminology, for DL CoMP the high data rates can be achieved by either "joint processing" or "coordinated scheduling". The 'joint processing' technique involves multiple eNB's (evolved Node B's—the LTE base stations) collaborating to change the interfering signal into a desired signal. Neighbour cells transmit data to a UE (user equipment, usually a mobile or fixed subscribed terminal such as telephone, PDA or laptop) in a cooperative manner such that the cell edge throughput is enhanced. In this case, data and the channel state information (CSI) should be shared among the collaborating eNBs through eNB backhaul link. The alternative 'coordinated scheduling' approach involves multiple eNB's collaborating to mitigate inter-cell interference (ICI). Coordinated scheduling scheme can be supported by UE reporting the preferred PMI (precoding matrix index) set. Preferred PMI set reporting is seen as a form of collaboration among multiple eNBs to mitigate ICI by using the least interfering PMI in the neighbouring cells. For the purposes of DL CoMP, it should be noted that all H-ARQ processing (combining) is carried out by the UE.

For UL CoMP, an anchor base station (or network station) is used as the primary link to a user equipment and is thus responsible for transmitting control information to the user equipment. In the case of LTE, the anchor base station transmits the PDDCH assignments to the user equipment. Other base stations (network stations), usually in neighbouring cells, can assist with reception of UL data transmission and are referred to as assisting base stations. Together the anchor base station and assisting base stations form a reception set of all the base stations which may receive data from the user equipment on the uplink. The reception set for each UE is defined by the anchor base station and transmitted to the user equipment and assisting base stations. For UL CoMP, all eNB's (including the anchor eNB and assisting eNBs) in the reception set will receive any data burst from the UE. The assisting eNB's should forward this data for combining, to the anchor eNB, either in complete packets (PDU format) if decoding is successful or as a physical bit-stream if not. Generally in LTE with eNB to eNB communication, this data will be transported via the X2 (or backhaul) interface between eNB's which can introduce an unavoidable latency. This latency will of course be dependant on the transmission media used and the processing delay within the eNB X2 interface.

One key concern in UL CoMP is how to make the multipoint transmission and forwarding fit within the timing structure of the communication system in which it is used. In particular, the forwarding can lead to delays which make the required round trip time (RTT) between sending data and receiving an acknowledgement difficult to achieve. In LTE, this concern currently relates to the existing HARQ RTT of 8 ms which is defined in Release 8 (3GPP-LTE). FIG. 1 shows the timing relationship for the DL and UL HARQ operation in LTE. The UL HARQ transmission timing for LTE in FDD mode illustrated involves only one eNB (and therefore no CoMP). In the DL (upper) section 10, the base station transmits control/allocation information and the UE receives it after a transmission time of Txt. Conversely, in the UL (lower) section 20 the UE transmits and the eNB receives after transmission time Txt. The shaded sections show transmission of particular resource allocation information from the eNB and the response from the UE.

The PDCCH (Physical Downlink Control Channel) will provide resource allocation information using DCI format 0 that will allow the UE to locate the UL resource that shall be used for its data transmission. The UE will then use the PUSCH (Physical Uplink Shared Channel) to transmit the data which should be received by the eNB in the $4^{th}$ subframe following the resource allocation information (PDCCH). The eNB therefore has only 3 ms in which to process the received data, determine if the packet is in error and generate the PHICH (Physical HARQ Indicator Channel) payload. The PHICH is used to inform the UE if the previously transmitted packet has been received in error by simply using the general ACK/NACK feedback protocol (ACK=correct, NACK=incorrect).

Keeping in mind the above timing and considering an UL CoMP scenario involving a number of eNB's, it will become very difficult to achieve gain by a bit-stream combining, especially on the first transmission. This is because the anchor eNB has to receive the physical bit-streams from all assisting eNB's before beginning to process the combined streams, and given the eNB has only 3 ms of processing time, then the X2 delay would have to be in the order of 1 ms. In the current LTE specification, the X2 delay is required to be between 12 and 20 ms which obviously makes it impossible to satisfy the current HARQ RTT. Although this X2 delay may decrease over time as a result of rapid advances in technology, the decrease is unlikely to be in the order of 1 ms.

It is thus desirable but difficult, to implement CoMP with acknowledgement/retransmission techniques.

The invention is defined in the independent claims, to which reference should now be made. Advantageous embodiments are set out in the sub claims.

According to the invention embodiments there is therefore provided a method in a wireless communication system comprising a user equipment, an anchor network station and at least one assisting network station, wherein the user equipment transmits the same data to the network stations and the network stations each transmit an acknowledgement of the data to the user equipment in response; and wherein the or each assisting network station also forwards the data to the anchor network station.

Unlike previous methods, present invention embodiments allow an acknowledgement signal to be transmitted from an assisting network station to the user equipment in a CoMP technique. Data is transmitted to the anchor network station and at least one other network station and in the prior art the assisting network station or stations would simply forward the data to the anchor network station.

The inventors have come to the surprising realisation that it is possible to use simple acknowledgement from the or each assisting network station to improve system performance. For example, the data may be properly received by the assisting network station but not by the Anchor network station. In this case retransmission from the UE will become unnecessary. The combination of the data forwarding as known from prior art CoMP and multiple acknowledgements lead to a combined improvement in system performance which may be particularly useful for low mobility users, such as pedestrians and at cell edges.

The term "network station" includes any station for transmission to user equipment that is connected via a wired connection to the network, such as a base station and including base stations for cells of different sizes such as base stations for macro-, pico- and femtocells. The term "user equipment" includes any subscriber terminal, whether fixed or mobile, for example a cell phone, PDA or laptop computer.

Preferably, the data is forwarded from the or each assisting network station to the anchor network station over the system backhaul. The network stations standardly communicate over the system backhaul, for example the X2 interface defined in LTE.

New forwarded data is sent to the anchor network station and may be used there in a number of different ways. In many circumstances, the forwarded data is combined in the anchor network station with the data from direct transmission to the anchor network station. Taking the example of soft combining in HARQ, any data subsequently received after a first transmission which has not been successfully decoded is combined into the HARQ buffer and then decoding is attempted again. Thus transmissions, any retransmissions and forwarded data can all be combined in the anchor network station.

The data may be decoded successfully either at the anchor network station, at one of the assisting network stations or at both. Preferably, if the anchor network station decodes the data, the anchor network station and/or the user equipment inform the or each assisting network station. This information may be useful for example so that the assisting network station or stations may flush the buffer into which data is combined.

Preferably, if the assisting network station or one of the assisting network stations decodes the data, it transmits a positive acknowledgement to the user equipment and the user equipment informs the anchor network station of the successful transmission. It is of course important that the anchor network station is informed of successful decoding. This allows the anchor eNB or other network station to flush any stored data in its buffer and allocate resources for transmission of a new packet rather then retransmission.

In many situations there will be more than one assisting network stations. If one of the assisting network station decodes the data, the other assisting network stations should preferably be informed that this has occurred. Either the user equipment or the anchor network station or the assisting network station that has decoded the data may inform the other assisting network stations accordingly. In one preferred embodiment, the user equipment informs the other assisting network stations. This may be advantageous because the user equipment may anyway be informing the Anchor network station of the successful transmission so that the same signal can be received by the existing network stations.

In the majority of modern protocols data is sent as data packets. Each network station will attempt to decode the data received to reform the data packet. In one preferred embodiment, the or each assisting network station forwards the data package as bits and then attempts to decode the data package, subsequently forwarding it as a complete packet if it is decodable. This methodology avoids delay but introduces some redundancy because bits may be forwarded as soft bits in a stream and then subsequently as parts of the data packet if successfully decoded. Alternatively, the or each assisting network station may attempt to decode a data packet and forward the data packet as bits if not decodable and as a complete packet if it is decodable. This methodology reduces redundancy but has the disadvantage of introducing delay.

In some preferred embodiments, each network station forwards the data to the or each other network station. Such embodiments may be applicable in certain circumstances to increase the chances of successful transmission or retransmission. However, there are disadvantages in terms of the additional burden on the backhaul.

In some other preferred embodiments, the data is only forwarded when it has a signal to noise ratio or other signal quality metric above a predetermined threshold. The signal to noise ratio (for example the SINR) is likely to be already available at the network stations and therefore using it to determine whether to forward the data should not involve extra signalling. This technique of only forwarding data if the signal to noise ratio is suitable can reduce the burden on the network backhaul and therefore can be particularly suitable for use with the cross-forwarding mentioned above.

In many preferred embodiments, a re-transmission process is used, in which each network station sends a positive acknowledgement if the data is decodable, or a negative acknowledgement if the data is not decodable, the negative acknowledgement acting as a request for re-transmission. Such a re-transmission process is known in ARQ and HARQ. Here, there may be a predetermined round trip time (RTT) between sending the data in a first transmission and receiving an acknowledgement for that transmission. If the RTT does not allow sufficient time for the data forwarding from the assisting network station to the anchor network station, forwarded data will be combined not only with data from the first transmission but also from at least one re-transmission from the user equipment to the Anchor network station. Conversely, if the data forwarding can be achieved within the RTT, it may be possible to combine the forwarded data with the data from the first transmission only.

In some preferred embodiments, a predefined maximum number of re-transmissions sets a total process time available and data is only forwarded if the time remaining before the total process time elapses is longer than the time required for the data to be transmitted to the anchor network station. Preventing re-transmissions which will not be used because the re-transmission process comes to an end before they arrive at the anchor network station reduces unnecessary transmission across the backhaul.

In many embodiments the acknowledgement is an ACK/NACK signal in synchronous ARQ or HARQ. Typically, the data is transmitted as a data packet in a wireless communication system on the uplink, for example in a UMTS, LTE, LTE-A, or WiMAX system.

Embodiments of the invention also provide a wireless communication system comprising a user equipment, an anchor network station and at least one assisting network station, wherein the user equipment is operable to transmit the same data to the network stations (that is, the anchor network station and the or each assisting network station) and the network stations are each operable to transmit an acknowledgement of the data to the user equipment in response; and wherein the or each assisting network station is preferably also operable to forward the data to the anchor network station.

In a further aspect, embodiments of the invention provide a user equipment in a wireless communication system comprising the user equipment, an anchor network station and at least one assisting network station, wherein the user equipment is operable to transmit the same data to the network stations and to receive in response an acknowledgement of the data from each of the network stations.

In a yet further embodiment of the invention there is provided an assisting network station in a wireless communication system comprising a user equipment, an anchor network station and the assisting network station, wherein the assisting network station is operable to receive data transmitted to it and the anchor network station and to transmit an acknowledgement of the data to the user equipment in response; and wherein the assisting network station is preferably also operable to forward the data to the anchor network station.

In a still further embodiment of the invention there is provided an anchor network station in a wireless communication system comprising a user equipment, the anchor network station and at least one assisting network station, wherein the anchor network station is operable to: receive data transmitted from the user equipment; transmit an acknowledgement of the data to the user equipment in response; receive the same data forwarded from the or each assisting network station; and if the or one of the assisting network station decodes the data, to receive an indication from the user equipment or the successful assisting network station that the data has been decoded.

Corresponding aspects for the method in each one of the user equipment, assisting network station and anchor network station are also within the scope of the invention.

According to a final aspect, invention embodiments provide a computer program which when downloaded onto an apparatus causes it to become the user equipment, anchor network device or assisting network device detailed above or which when executed on a computing device of a telecommunications apparatus carries out the method of any of the preceding method statements.

Features detailed above with respect to any different aspects may be combined with any or all the features of the other aspects since they refer to the same invention. In particular, means/functionality may be provided in the apparatus aspects which reflect the method steps set out in detail above.

Looking specifically at LTE again, one simple solution that would allow a combining gain to be achieved after the first transmission would have been to modify non-CoMP RTT, for example the RTT of Release 10 (LTE-A) to suit the X2 delay, as this would then allow the anchor eNB to combine and process all the bit-streams in a timely manner before generating ACK/NACK. However, as Release 10 (Rel-10) is required to be backwards compatible with Release 8 (Rel-8), this implies that an Rel-10 eNB would be supporting two separate HARQ RTT's for two or more distinct UE groups (namely Rel-8 UE's and Rel-10 UE's). This type of scenario would seriously complicate UE scheduling and HARQ management within the eNB, and is therefore not advisable.

Continuing with the specific LTE example, invention embodiments propose a solution whereby the current Release 8 RTT of 8 ms may be left unchanged but at the same time allow UL CoMP to operate and potentially achieve gains through selection diversity and/or physical bit-stream combining (MRC). The proposed mechanism simply mandates that the eNB's belonging to the reception set shall receive (simultaneously transmitted) data from a single UE and send an acknowledgement in return. Upon receiving the data, the assisting eNB's may forward the data as physical bit-stream (soft bits) to the anchor eNB.

If the assisting eNB decodes successfully it can then also forward the PDU (packet) to the Anchor eNB. Otherwise it can store the soft bits in the HARQ buffer. The UE can simply monitor the PHICH of each eNB to determine if the packet has been decoded correctly (ACK). If the anchor eNB decodes correctly it can use the X2 interface to inform the assisting eNB's so they can flush their HARQ buffers and consequently free up resource. On the other hand, if an assisting eNB decodes correctly, the UE can inform the anchor eNB of this state using the air interface (MAC or PHY indicator). The anchor eNB can then inform (using X2) the other assisting eNBs that the packet has been received correctly.

Alternatively, if for example the eNB received data decoding time is much less than 2 sub frames and/or the X2 interface delay is sufficiently small, the assisting eNBs can first decode the data and in the case the assisting eNB has failed to successfully decode the received data packet it will forward the data stream to the Anchor eNB, otherwise it will forward the successfully decoded packet. This avoids the need for double transmission in the case when the packet is successfully decoded at the assisting eNB.

As stated previously, invention embodiments propose an HARQ signalling mechanism for UL CoMP that will allow both Rel-8 and Rel-10 UE's to coexist in the same system by ensuring that both operate to the same HARQ RTT of 8 ms. Consequently, those Rel-10 eNB's that are capable of UL CoMP will simply follow the same timing as Rel-8 eNB's but may deal with re-transmitted packets in a different manner.

Preferred features of the present invention will now be described, purely by way of example, with reference to the accompanying drawings, in which.

Figure 1:
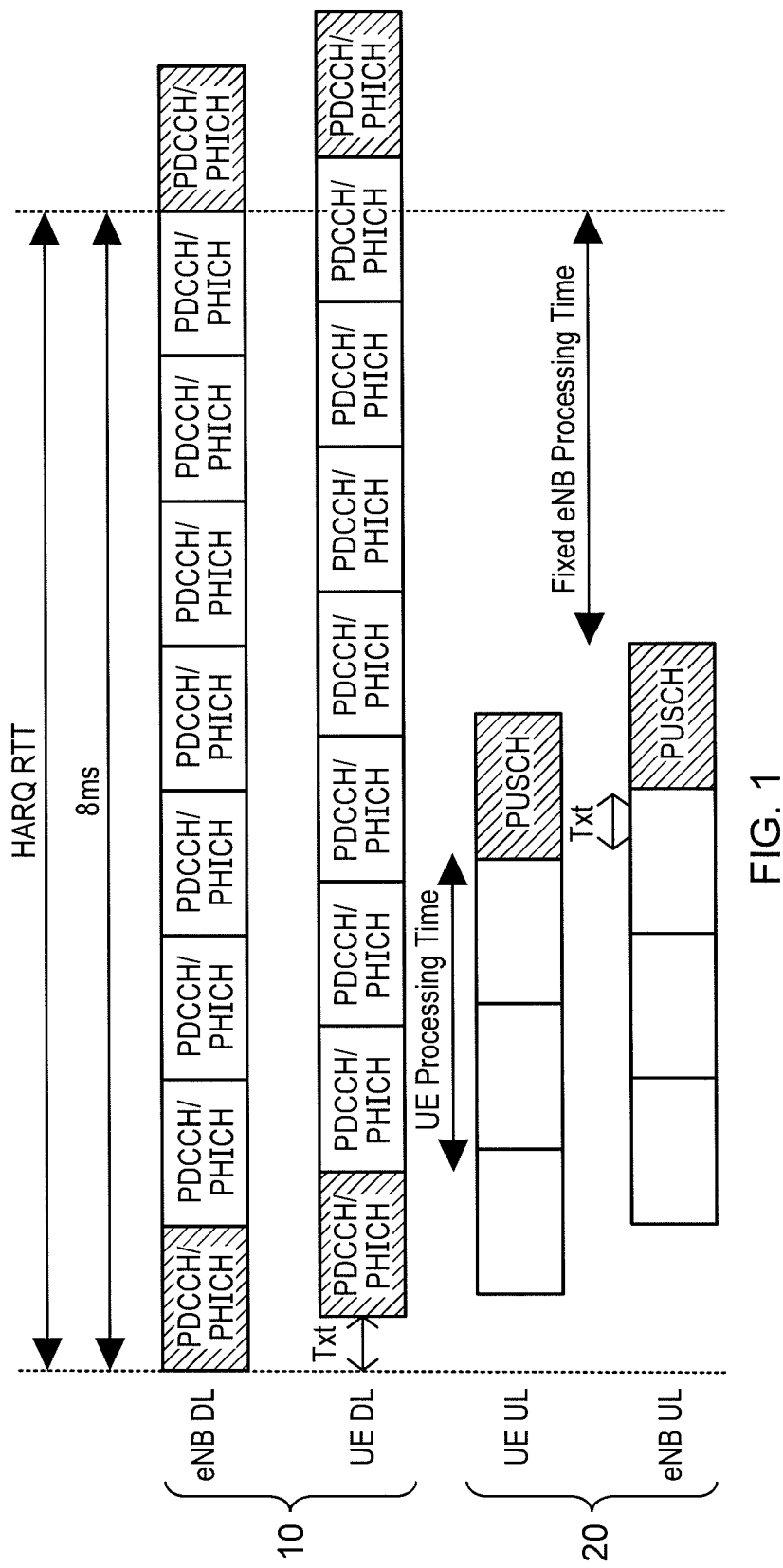
FIG. 1 is a timing diagram of UL HARQ transmission timing for Release 8 in LTE.
Figure 2:
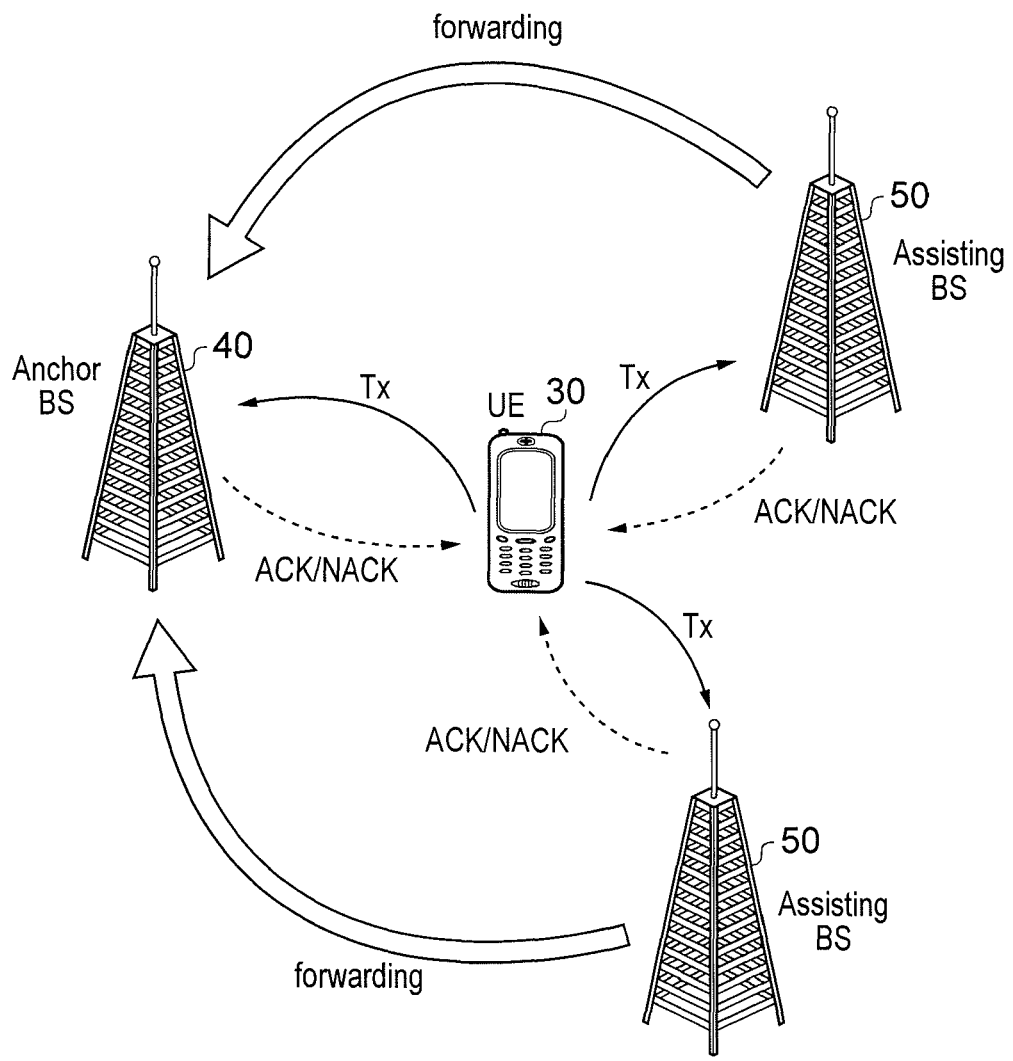
FIG. 2 is a schematic diagram of communication system components and depicts a general embodiment of the invention.

FIG. 2 shows an illustrative communication system according to the invention embodiments. One anchor base station is shown along with two assisting stations. Of course there may be any number of assisting network stations but generally there is only one anchor network station. A user device or user equipment 30 is positioned between the Anchor BS 40 and the two assisting BSs 50. The diagram shows UE 30 transmitting data/information. This transmission is therefore on the uplink and is shown over the air interface. Each network station responds to the transmission with an acknowledgement. The acknowledgement as shown here as an ACK/NACK signal. Additionally, the assisting network stations are shown to forward the data/information to the anchor network station.

The UE may decode the ACK/NACK or other signal acknowledgement from multiple network stations as in the following LTE example. Firstly, it should be noted that the PHICH carries ACK/NACKs for several UEs.

1. Initially, anchor eNB informs the UE of the cooperating eNB set (known as the reception set).
2. Using the cell ID's of cooperating eNB's, the UE can determine the location of the PHICH for each eNB. Note that LTE is a re-use 1 system which means this determination is easy from an implementation point of view. That is, there is no need to simultaneously monitor more than one carrier. Also, the location of the PHICH in adjacent eNB's is staggered (in frequency) as this will avoid PHICH to PHCIH interference, thus making the channel more robust.
3. The mapping of exact ACK/NACK within the PHICH is implicit as the UE's lowest UL PRB (physical resource block) index is associated to its PHICH index. This allows the UE to easily locate the ACK or NACK.
4. After locating the ACK/NACK the UE can then attempt to decode this and in LTE will simply use the Cell ID of each eNB to descramble the information.

Steps 2-4 are with respect to one eNB but the UE should be capable of processing PHICH's from multiple eNBs in parallel as the physical resource used for PHICH is different in adjacent cells.

Figure 3:
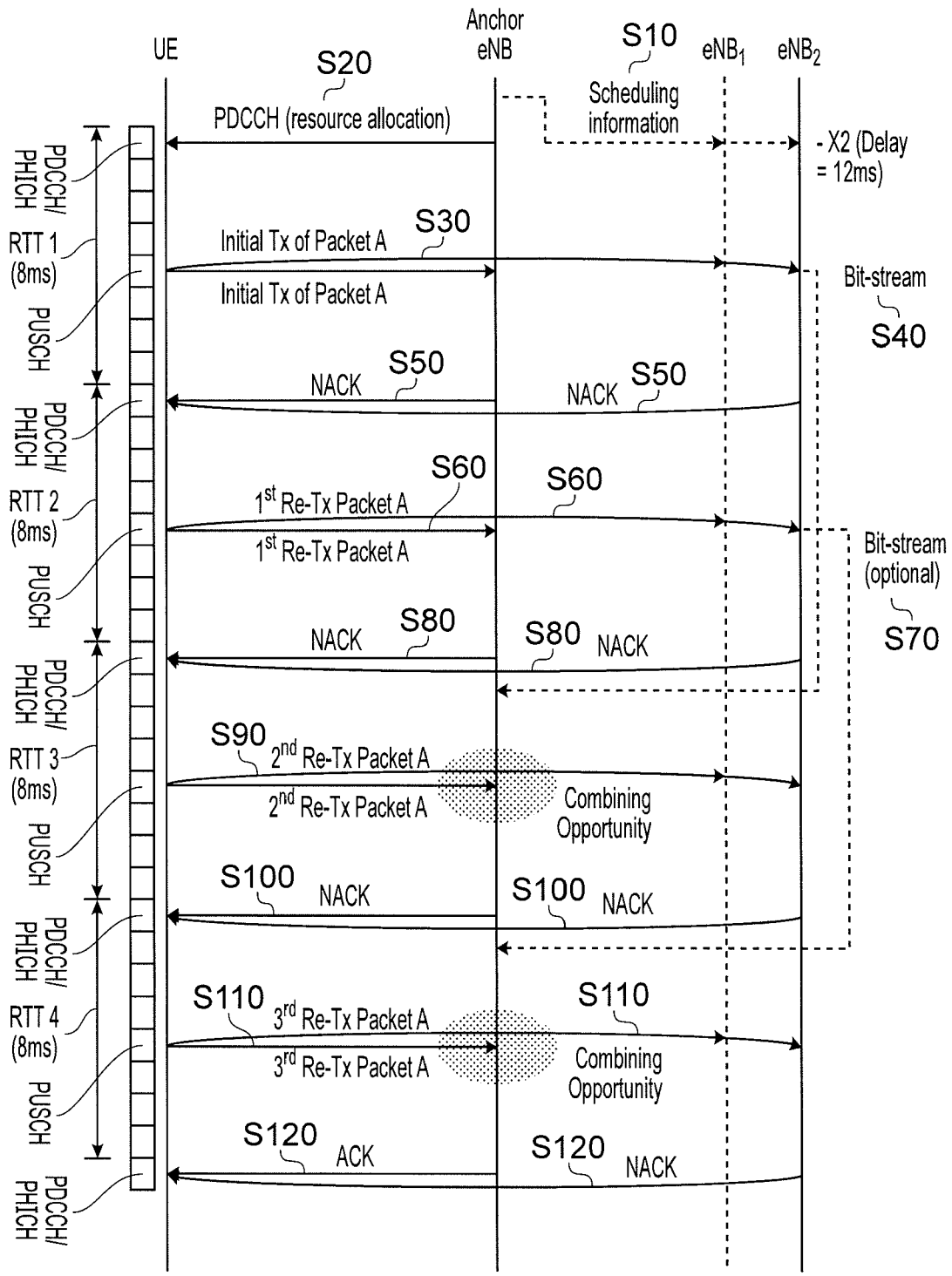
FIG. 3 is a timing diagram showing an example of the overall control/data exchange flow.

FIG. 3 depicts an example of the overall control and data exchange between the UE, anchor eNB and assisting eNB's in an LTE example.

Initially, the anchor eNB transmits scheduling information. The scheduling information arrives at the assisting eNB$_1$ and eNB$_2$ with an X2 delay of 12 ms. Subsequently, the anchor eNB sends S20 a resource allocation method to the UE to instruct it to transmit in the PUSCH channel shown in the first RTT. In step S30, the UE transmits a data packet, referred to as packet A which arrives at both the anchor eNB and the assisting eNBs eNB$_1$ and eNB$_2$. Further action by eNB$_1$ is not shown but eNB$_2$ is shown to transmit a bit stream in step S40 to the anchor eNB. In step S50 the anchor eNB$_1$ and eNB$_2$ both send an acknowledgement signal in the next RTT, RTT2. In this case both signals are NACK signals and act as a request for retransmission. This is synchronous and therefore the transmission timing is preallocated as the PUSCH channel in RTT2 as shown. Retransmission takes place in step S60. The retransmission is preferably combined with the previous transmission in the anchor eNB$_1$ and eNB$_2$ again sends a bit stream in optional step S70 to the anchor eNB. S80 shows a further NACK acknowledgement signal from both anchor eNB and eNB$_2$ in the first PDCCH/PHICH channel of RTT3. It is with approximately the same timing as this NACK transmission that the bit stream from eNB$_2$ arrives at the anchor eNB. Thus, the next retransmission shown as S90 allows a combination in the anchor eNB buffer of not only a retransmission and two retransmissions of packet A to the anchor eNB but also of the bit stream from eNB$_2$. In the example shown, this combining does not yet result in a decodable packet so that NACK signals are again sent back from both eNBs to the UE in step S100 in the first available channel in RTT4. The resulting transmission S110 results in successful decoding of packet A, perhaps assisted by the optional bit stream sent from eNB$_2$ after the first retransmission. The skilled reader will appreciate that the bit stream may be a combination of bits from the transmission and first retransmission to eNB$_2$ or it may be the bits from the most recent transmission only. In step S120, the anchor eNB has successfully decoded the packet and send an ACK signal whereas the eNB$_2$ sends a NACK signal.

In this case, with an X2 delay of ~12 ms it is clear that a combining (physical bit-stream) gain from the $2^{nd}$ or $3^{rd}$ retransmission is possible. On the other hand, for the initial transmission and $1^{st}$ re-transmission only a selection diversity gain is possible and it should be noted that the actual return will be somewhat reduced when compared to that of physical bit-stream combining.

Different scenarios will now be described with reference to timing diagrams of FIGS. 4, 5, 7 and 8. The basic procedure and timing shown in all the timing diagrams is the same as in FIG. 3, so detailed description will be omitted and only the points of difference with respect to previous Figures will be enumerated.

Selection Diversity Gain

Figure 4:
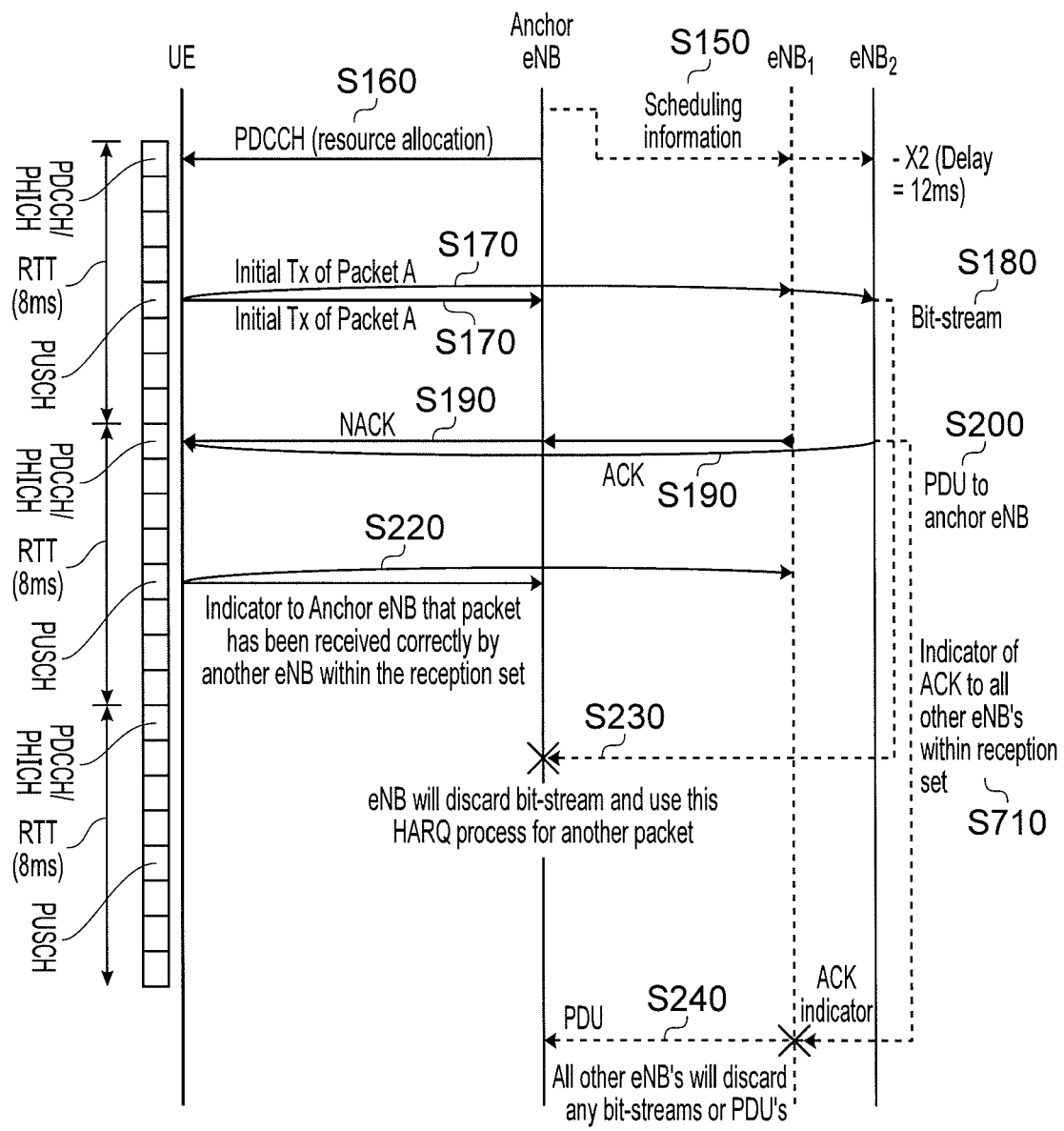
FIG. 4 is a timing diagram showing selection diversity when an assisting eNB receives correctly.

Looking a little closer at the selection diversity when X2 delay is ~12 ms (i.e., Initial Tx or $1^{st}$ ReTx) and by using the example in FIG. 4 it is possible to achieve some selection diversity from the assisting eNB's. In this case, the assisting eNB's are $eNB_1$ and $eNB_2$.

As shown in FIG. 4, the assisting $eNB_2$ has successfully decoded the packet after the initial transmission S170 and has generated an ACK which will be transmitted to the UE via the PHICH in step S190. On the other hand, the anchor eNB has failed to decode successfully and consequently a NACK is generated and transmitted in step S190. At the same time, $eNB_2$ will forward the correct PDU to the anchor eNB using the X2 interface in step 200. In step 210 the $eNB_2$ may also send (using X2) an ACK indicator to all other assisting eNB's to inform them that the HARQ process was terminated by an assisting eNB. This will then allow all other assisting eNB's to flush their HARQ buffers (for this HARQ process) and thus free-up their resource.

Alternatively or additionally the UE can then inform the assisting eNB's (as well as the anchor eNB) that the packet has been received correctly (by an assisting eNB) in step 220. This can be achieved by transmitting a MAC or PHY based indicator (assisting eNB ACK or something similar) using the PUSCH or PUCCH(Physical Uplink Control Channel), respectively. This allows all eNB's to flush the data buffers and release the resources to initiate the next HARQ process.

If the assisting eNB's fail to receive this indicator from the UE and/or the successful assisting eNB, $eNB_2$, then they will be expecting a re-transmission from UE. When re-transmission data is not received the assisting eNBs will assume failed detection and send NACK to UE and continue to do so until HARQ process is timed out.

Figure 5:
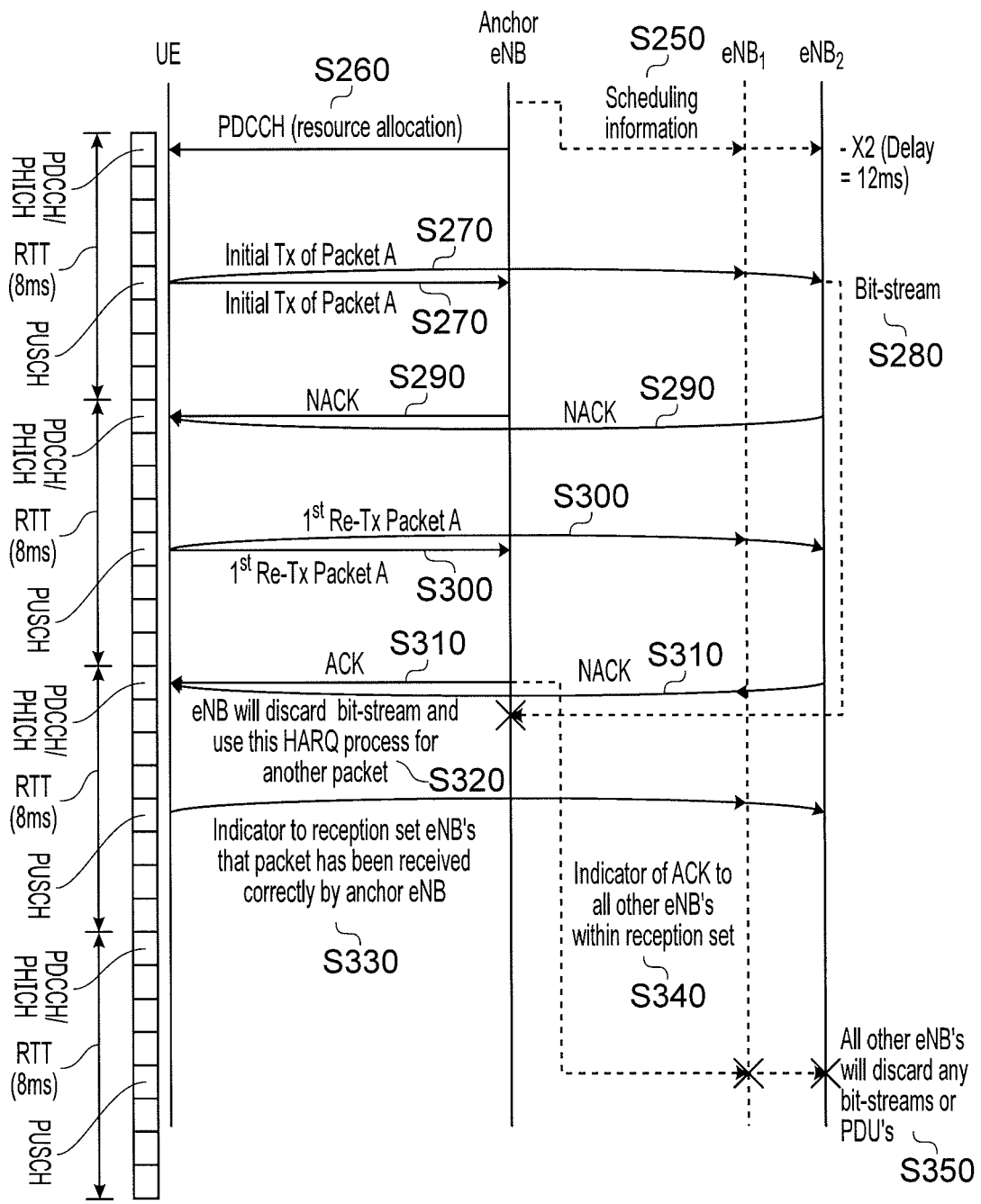
FIG. 5 is a timing diagram showing selection diversity when the anchor eNB receives correctly.

Using the example in FIG. 5, we now illustrate the case where the Anchor eNB correctly decodes the packet whilst the assisting eNB's fail.

As depicted in FIG. 5, the Anchor eNB has successfully decoded packet A after the $1^{st}$ re-transmission in step S300 and as a result has generated and transmitted an ACK to the UE in step S310. At this stage and using the X2 interface, the Anchor eNB shall send an indicator of ACK in step S340 to inform all other eNB's that the packet has been successfully decoded. The UE may also or alternatively inform the assisting eNB's in step S330 that the packet has been received correctly (by the Anchor eNB) which can be achieved by transmitting a MAC or PHY based indicator (assisting eNB ACK or something similar) using the PUSCH or PUCCH (Physical Uplink Control Channel), respectively. This allows all assisting eNB's to flush the data buffers and release the resources to initiate the next HARQ process.

This indicator thus indicates that the current HARQ process has been terminated and that all related bit-streams/PDUs should be discarded. Additionally, the eNB will discard any bit-streams that may have been received from other assisting eNBs.

Either one or both of the UE and Anchor eNB may inform the assisting eNBs that the packet has been decoded in this and the previous example. The advantage of letting the UE send acknowledgment is elimination of X2 delay which cannot be avoided in the case where the Anchor eNB sends the indication to the Assisting eNB(s). However, the message from the UE is subject to decoding failure due to the air interface especially if sent on PUSCH (similar to data packet itself). Thus the message on the X2 interface will be more robust.

If the HARQ process reaches the max number of retransmissions, the Anchor eNB may retain the buffered bit stream for sufficient length of time (eg: in the example considered here ~12 mS, this is the latency of X2 link) to ensure that any forwarded data from the last re-transmission reaches Anchor eNB. However, the Anchor eNB and assisting eNBs need not wait for this to be completed. The Anchor eNB and assisting eNBs should immediately start the next HARQ process.

To improve the UL data detection probability and potentially minimise the re-transmissions, the eNBs (Anchor and the assisting eNBs) can cross exchange the data (that is each eNB can send its bit stream to all the other eNBs). This undoubtedly will increase the amount of data being exchanged on the X2 interface and in some X2 links the traffic load may become prohibitive.

By referring to the examples in FIGS. 4 and 5 (when X2 delay is ~12 ms), it is apparent that a selection diversity gain (from the use of more than one transmission path) is possible from either the initial transmission or $1^{st}$ re-transmission.

Comparison of Selection Diversity Gains

The selection diversity is traditionally viewed in the context of multiple signals (through multiple radio channels) reaching a single radio receiver. It is the simplest form of receiver diversity and consequently its performance is slightly inferior to the more complex Maximal Ratio Combining (MRC). Invention embodiments use the selection diversity in the context of UL CoMP within the X2 (backhaul) delay time frame, through the ACK/NACK feedback messages. The radio channels linking the UE with the multiple eNodeBs (anchor and multiple assist eNodeBs) are spatially far apart and are thus very much de-correlated. A theoretical comparison between selection diversity and MRC within the theoretical Rayleigh fading channel is presented below in FIG. 6, from a simulation study. The channel co-efficients are considered to be un-correlated. Similar trends to these results can be found in published literature.

Figure 6:
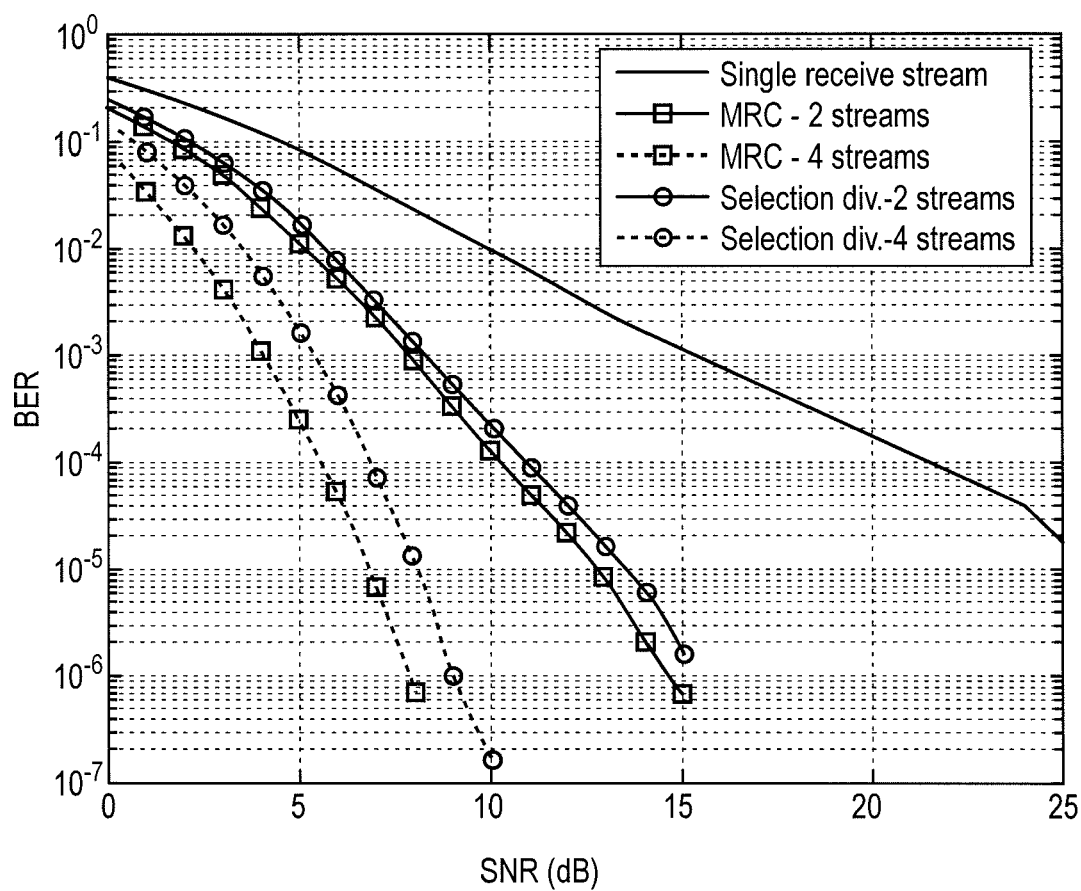
FIG. 6 is a graphical comparison of Selection diversity and MRC performance in Rayleigh fading channel.

These simulation results in FIG. 6 can be explained by considering an average SNR value for the cell edge users. In practical systems this cell edge SNR is designed to be around 0 dB. However in these simulations error correction coding was not used and leaving a 5 dB allowance for that, we can consider 5 dB SNR. The results show that by using selection diversity with 2 streams (anchor eNodeB and one assist eNodeB) the BER (bit error rate) can be reduced significantly (from $9\times10^{-2}$ to $1.5\times10^{-2}$). In a real system, this translates to receiving correct packets more often and generating ACK's. If 4 receiver streams are employed (anchor eNodeB and three assist eNodeBs) the error rate would reduce by further 10 folds (to $1.5\times10^{-3}$). The critical point to make is that during the X2 time frame when MRC is not possible, applying this form of selection diversity already gives a significant performance gain.

Physical Bit-Stream Combining Gain

Figure 7:
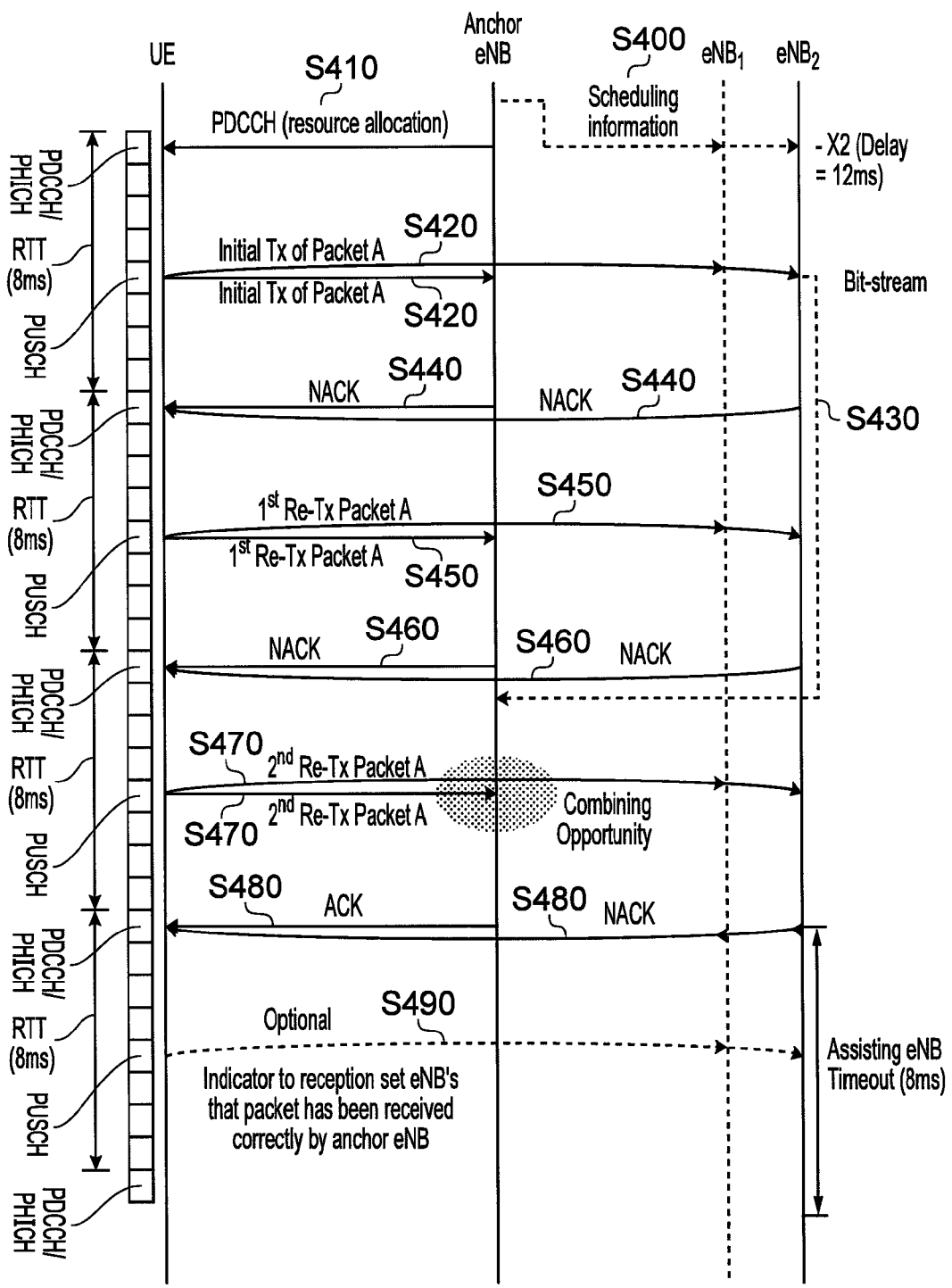
FIG. 7 is a timing diagram showing an example of combining when the anchor eNB receives correctly after $2^{nd}$ ReTx.

As previously mentioned, for an X2 delay of ~12 ms it becomes impractical to achieve any combining gain before the $2^{nd}$ re-transmission. However, as a result of the physical bit-streams that have been forwarded by the assisting eNB's to the Anchor eNB, the Anchor eNB may combine these streams on the $2^{nd}$ re-transmission and potentially benefit from an MRC gain. If the anchor eNB fails to successfully decode the packet at the $2^{nd}$ re-transmission, the anchor eNB will again try physical bit-stream combining at the $3^{rd}$ re-transmission. FIG. 7 illustrates an example in which anchor eNB, as a result of physical bit-stream combining, successfully decodes the packet after the $2^{nd}$ re-transmission.

In FIG. 7, the anchor eNB and assisting eNB's fail to decode the packet after the $1^{st}$ re-transmission S450 and therefore a $2^{nd}$ re-transmission S470 is generated and transmitted by the UE. At this stage, the anchor eNB combines the physical bit-streams (from Initial Tx) which have been received from the assisting eNB's with the physical bit-stream received from the UE. Due to combining gain, the packet is successfully decoded and the Anchor eNB generates an ACK, which is transmitted to the UE in step 480/

As the X2 delay is ~12 ms, instead of notifying the assisting eNB's that the packet has been decoded successfully, the anchor eNB will not send any message, instead allowing the assisting eNB's to timeout (after the final RTT when the maximum number of retransmissions has been reached) when the HARQ process has been terminated. Here, the assisting eNBs may not send any further bit streams anyway, since the time taken to send a bit stream would mean that it would arrive after the last opportunity to combine it with data in the anchor eNB's buffer following the final re-transmission. In essence, assisting eNBs may only forward the bit stream if it will be received before the end of the final RTT. However, in the case where the X2 delay is <8 ms, the Anchor eNB may send an indicator of ACK in step 490 to inform all other eNB's that the packet has been successfully decoded. In the case of LTE the maximum number of retransmissions allowed is 3; thus 4 transmissions in all are foreseen, including the first transmission. However, if this number were higher (eg: 8) then the other eNBs would need to be informed in order to terminate the HARQ process, clear the buffers, release the resources and initiate a new HARQ process.

Figure 8:
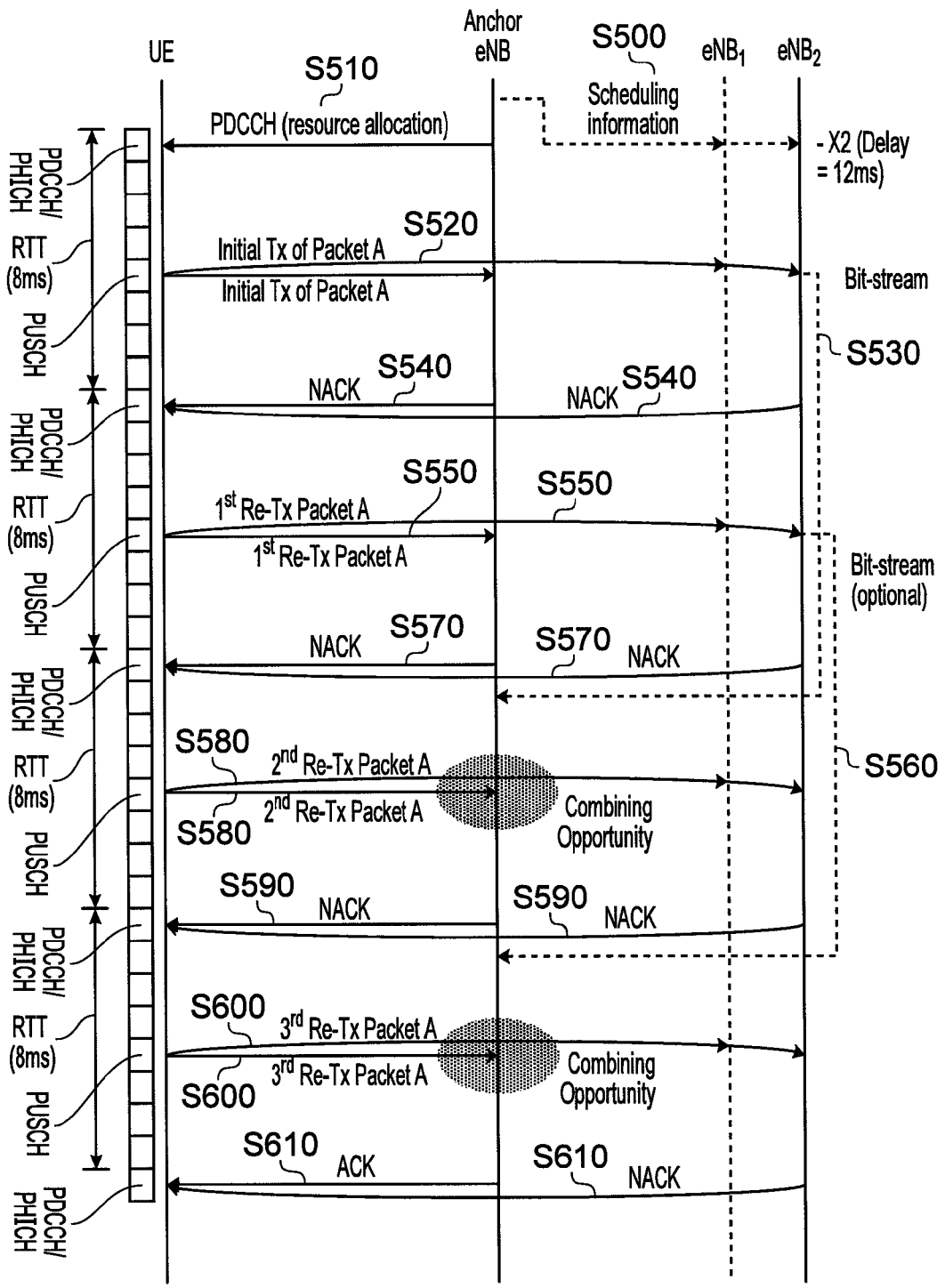
FIG. 8 is a timing diagram showing an example of combining when the anchor eNB receives correctly after $3^{rd}$ ReTx.

FIG. 8 illustrates an example in which anchor eNB is unable to decode at the $1^{st}$ combining opportunity (i.e., after the $2^{nd}$ ReTx) but successfully decodes the packet after the $3^{rd}$ re-transmission.

In FIG. 8, the anchor eNB and assisting eNB's fail to decode the packet after the $2^{nd}$ re-transmission and therefore a $3^{rd}$ re-transmission is generated and transmitted by the UE in step S600. At this stage, the anchor eNB combines the physical bit-streams (from Initial Tx) which have been received from the assisting eNB's with the physical bit-stream received from the UE in the first transmission, $1^{st}$ ReTx, $2^{nd}$ ReTx and $3^{rd}$ ReTx. To further increase the combining gain, the anchor eNB may additionally use the physical bit-streams (from $1^{st}$ ReTx received in step S560) which have been received from the assisting eNB's.

After successful decoding (due to combining gain), the anchor eNB will generate and transmit an ACK to the UE in step 610. As the maximum number of transmissions has been reached, the assisting eNB's will implicitly know that the HARQ process is over and thus no additional signalling (over-the-air OTA or X2) is required. In the case of LTE, the maximum number of retransmissions allowed is 3; thus 4 transmissions are provided in all including the first transmission. However, if this number were higher (eg: 8) then the other eNBs would need to be informed, to terminate the HARQ process, clear the buffers, release the resources and initiate a new HARQ process.

Figure 9:
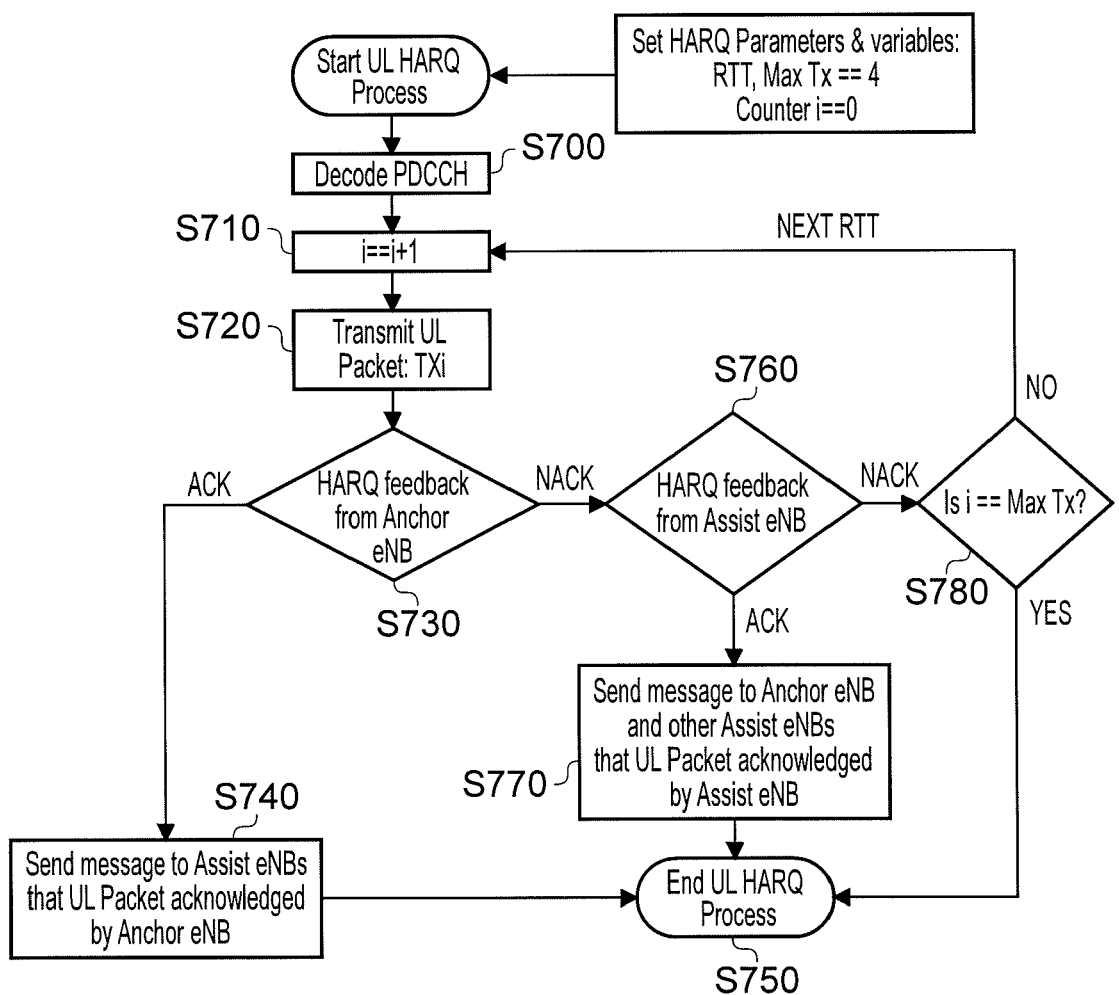
FIG. 9 is a UE operational flowchart for UL CoMP.
Figure 10:
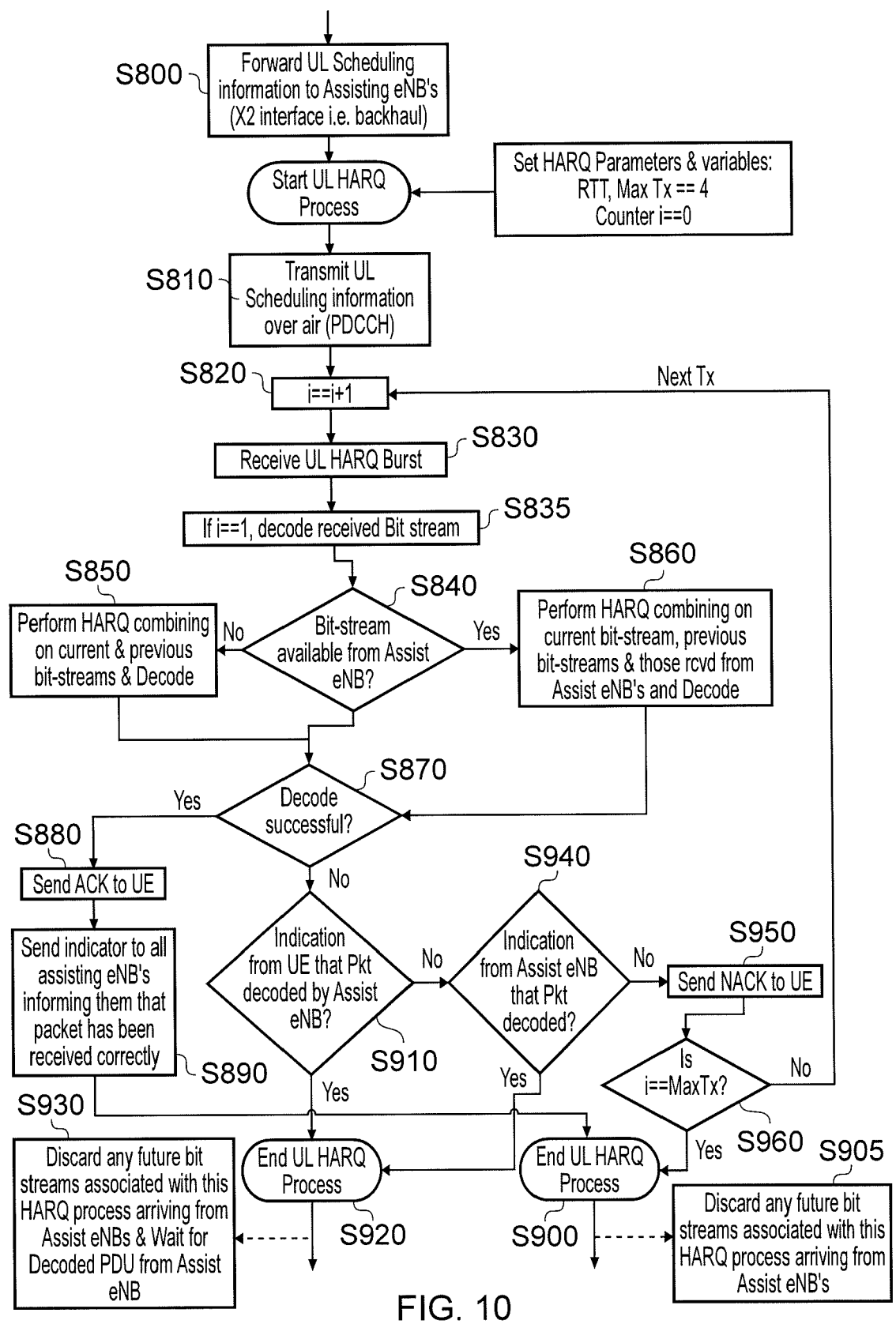
FIG. 10 is an anchor eNB operational flowchart for UL CoMP.
Figure 11:
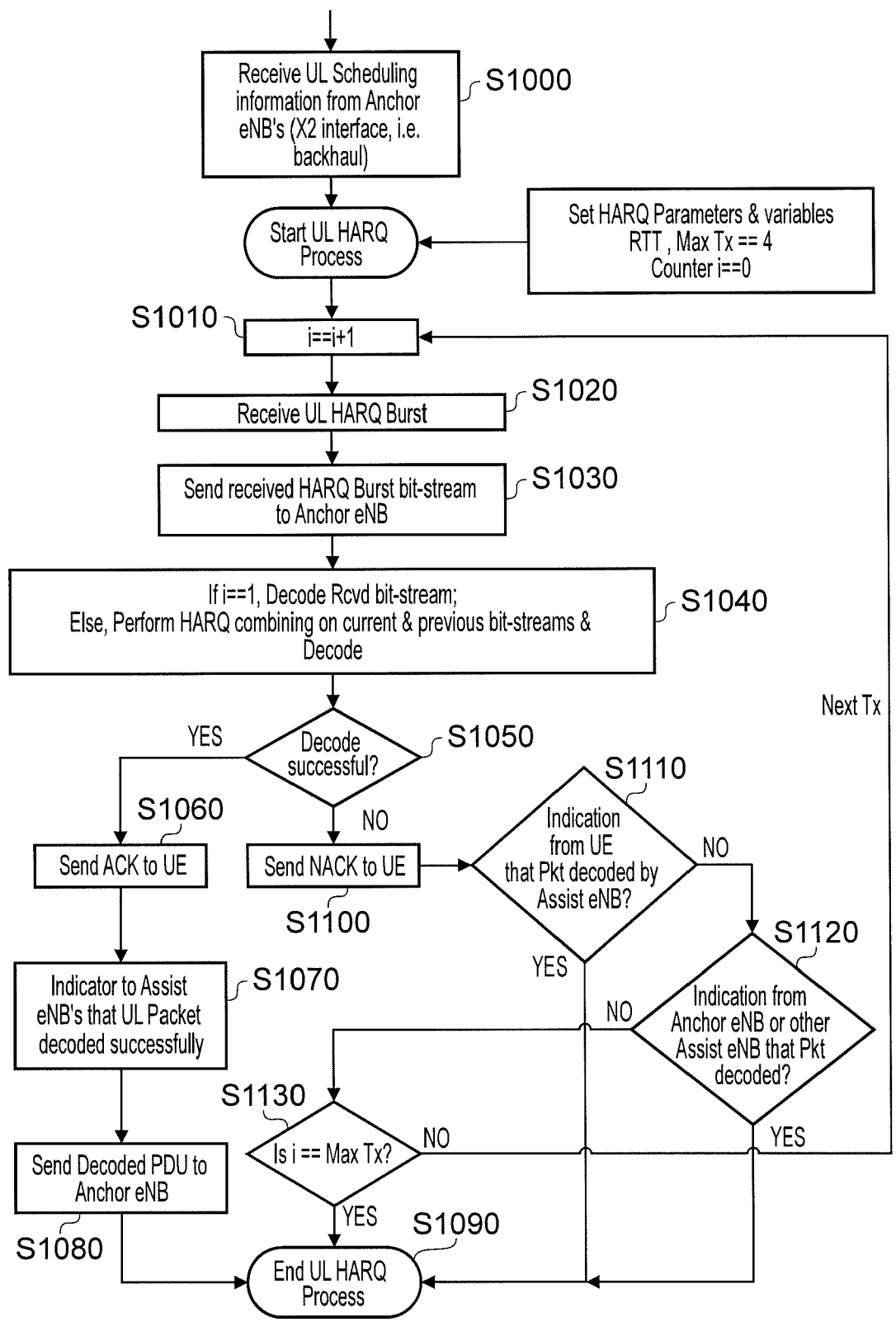
FIG. 11 is an assisting eNB operational flowchart for UL CoMP.

To further aid the understanding of invention embodiments FIGS. 9, 10 and 11 illustrate H-ARQ operation flowcharts of the UE, anchor eNB and assisting eNB, respectively.

These Figures all assume that HARQ parameters and variables have been set. Thus the roundtrip time has been set, the maximum number of transmissions has been set to 4 and a counter I is set to 0.

Turning specifically to FIG. 9 which describes the process in the UE, the first UE step S700 is to decode the PDCCH resource allocation which determines when the UE is to transmit. In step S710 a counter i is incremented and then in step S720 the UE transmits an uplink packet as TXi. In step S730 the UE receives feedback from the Anchor eNB. If the feedback is positive, meaning that the Anchor eNB has decoded the packet, then an ACK is received. In response to an ACK the UE send a message to the assisting eNBs in step S740 that the UL packet has been decoded by Anchor eNB and the UL HARQ process for that data packet ends. If on the other hand a NACK is received from the Anchor eNB indicating that the packet has not been successfully decoded by the Anchor eNB, there are two possibilities. As set out in step S760 either the HARQ feedback from the assisting eNB is positive or negative. If the feedback is positive then the packet has been decoded (ACK). The UE sends a message to the Anchor eNB that the packet has been acknowledged by the assisting eNB in step S770 and subsequently the process ends in step S750. In contrast, if the assisting eNB also sends a NACK signal, then in step S780 it is determined whether the maximum number of transmissions has been reached. If so the HARQ process ends in step S750; if not, the counter i is incremented in step S710 and the process continues with a retransmission.

FIG. 9 shows a flowchart with steps S760 and S770 for one single assisting eNB, but the skilled reader will appreciate the modifications necessary to reflect these steps for a plurality of assisting eNBs.

Continuing with an exemplary flowchart for the anchor eNB, in addition to the HARQ parameters and variables set in advance, the Anchor eNB must forward uplink scheduling information to the assisting eNBs in step S800 and transmit uplink scheduling information over the air interface to the UE in step S810. In step S820 the transmission counter i is incremented. In step S830, the uplink burst containing the packet in question is received from the UE. In step S835 the bit stream is decoded if it is a first transmission. In step S840, the anchor checks if a new bit stream is available from the assisting eNB's. If not, any previous bit streams are combined and decoded in step S850. Otherwise, the bit stream just received is combined with the previous bit streams (buffer contents) in step S860.

In step S870, it is determined whether the decoding has been successful.

If so an acknowledgement is sent to the UE in step S880, an indicator is sent to all the assisting eNBs informing that the package has been received correctly in step S890 and the HARQ processes ended in step S900, with any future bit streams being discarded in step S905. If decoding was not successful the Anchor checks in step S910 whether any of the assisting eNBs has decoded the packet. If so, the HARQ process ends in step S920 and any future bit streams associated with the HARQ process are discarded. The Anchor waits for the decoded data packet from the assisting eNB.

In some circumstances the UE may not have sent indication that the packet has been decoded by the assisting eNB and yet the assisting eNB might have sent such an indication as it has successfully decoded a packet. The indication message from the UE may be optional. If it is not implemented, the Anchor eNB has to rely solely on the message from Assisting eNB on the X2 interface. In step S940, the anchor checks whether there is an indication of success from the assisting eNB. If so the anchor completes step S920 and S930 to end the HARQ process of that data packet. If no such indication has been received, a NACK is sent to the UE in step S950 and it is determined in S960 whether the maximum number of transmissions has been reached. If so, the process ends with steps S900 and S905. If the maximum number of transmissions has not been reached the counter is incremented for retransmission.

FIG. 11 depicts the process for an assisting eNodeB. Initially, the HARQ parameters and variables must be set and the uplink scheduling information received from the Anchor. In step S1010 the counter is incremented. The assisting eNB receives the HARQ burst in step S1020 and immediately sends the received burst to the Anchor eNB in step S1030. The alternative scenario in which the assisting eNB initially attempts decoding the packet is not shown this flow diagrams. In step S1040 the bit stream is decoded if this is the first transmission. Otherwise, the received transmission is combined with previous received transmission(s) and then decoded. If the decoding is successful in step S1050 an acknowledgement is sent to the UE in step S1060, an indicator to the other assisting eNBs that the packet has been decoded successfully is sent in step S1070, the decoded package sent to the Anchor eNB in step S1080 and the process is ended in step S1090. On the other hand, if the decoding is not successful a NACK is sent to the UE in step S1100. The assisting eNB checks if it has received an indication from the UE, the Anchor eNB, or another assisting eNB that the packet has been decoded in steps S1110 and S1120. If such an indication has been received, the HARQ processes ended in step S1090. If not it is determined in step S1130 whether the maximum number of transmissions has been reached, if it has been the HARQ process ends, if it has not the process continues to the next transmission loop.

To minimise the data capacity demand on the backhaul (X2 interface in the case of LTE), the discussion in this application has focused on forwarding the received data streams to the anchor eNB for HARQ combining. However, as previously mentioned briefly, to maximise the HARQ gain, it is desirable to cross exchange the data streams between all the eNBs in the CoMP. In this case the benefit arises from the fact that each eNB will have the benefit of combining all the data streams it has received so far and the data streams forwarded by other eNBs in the CoMP set. Particularly if one or more of the assisting eNBs have better reception than the anchor eNB for two consecutive RTTs in one HARQ process then there is a higher probability of successfully decoding the packet. Naturally the cross exchange of data between all the eNBs in the CoMP set will increase the data throughput required in the X2 links. The increase will be proportional to the number of eNBs involved in the CoMP set.

One way to limit the increase is to introduce a SINR threshold. If the received data stream is below a certain SINR (or other signal quality metric) threshold then the data stream is not forwarded. This threshold can also be applied for simple forwarding of bit streams to the anchor eNB only.

In summary, the benefits of invention embodiments can include;

Improved System Performance: Cell-edge UE uplink benefits from multi-site diversity gain in addition to the same-site HARQ combining gain, thus leading to better system performance.

Backward compatibility: invention embodiments can provides full backward compatibility to existing standard specifications like 3GPP Rel 8 since no modification is required for pre-defined system parameters like HARQ RTT. This will avoid the need for eNBs to simultaneously handle two different HARQ RTTs which will increase the scheduler complexity and potentially lead to consequential scheduling inefficiencies.

Scalability: invention embodiments are suitable and can be easily implemented for any value of X2 delay, therefore can be applied to any network irrespective of the backhaul type.

Reduction of data buffer usage at the eNBs—this will bring down the average cost of data buffering and consequently release resource which can be used for other UE's and/or connections Although described with respect to an LTE system as an example, the present invention is not linked to such use.

The fields of application of this invention would include all wireless communications systems in which HARQ protocols or other re-transmission protocols are used in combination with CoMP techniques.

In any of the above aspects, the various features may be implemented in hardware, or as software modules running on one or more processors. The invention also provides a computer program or a computer program product for carrying out any of the methods described herein, and a computer readable medium having stored thereon a program or programs for carrying out any of the methods described herein. A computer program embodying the invention may be stored on a computer-readable medium, or it could, for example, be in the form of a signal such as a downloadable data signal provided from an Internet website, or it could be in any other form.

The invention claimed is:

1. A method in a wireless communication system comprising a user equipment, an anchor network station and at least one assisting network station, wherein the user equipment simultaneously transmits the same data to the anchor and assisting network stations;

the anchor and assisting network stations each receive the data and transmit an acknowledgement of the data to the user equipment in response; and the at least one assisting network station also forwards the data to the anchor network station, wherein a re-transmission process is used, in which each network station sends a positive acknowledgment if the data is decodable, or a negative acknowledgment if the data is not decodable, the negative acknowledgment acting as a request for re-transmission; and wherein a predetermined round trip time between sending the data in a first transmission and receiving an acknowledgment for the transmission does not allow sufficient time for the data forwarding, so that the forwarded data is to be combined in the anchor network station with data from the first transmission and at least one re-transmission from the user equipment to the anchor network station.

2. A method according to claim 1, wherein the data is forwarded from the at least one assisting network station to the anchor network station over the system backhaul.

3. A method according to claim 1, wherein the forwarded data is combined in the anchor network station with the data from direct transmission to the anchor network station.

4. A method according to claim 1, wherein if the anchor network station decodes the data, it transmits a positive acknowledgement to the user equipment and the anchor network station and/or the user equipment informs the at least one assisting network station of the successful transmission.

5. A method according to claim 1, wherein
if the assisting network station or one of the assisting network stations decodes the data, it transmits a positive acknowledgement to the user equipment and the user equipment informs the anchor network station of the successful transmission.

6. A method according to claim 1, wherein a plurality of assisting network stations is provided, and wherein if one of the assisting network stations decodes the data, the other assisting network stations are informed by the user equipment and/or anchor network station and/or assisting network station that has decoded the data.

7. A method according to claim 1, wherein
the data is sent as a data packet; and wherein
either the at least one assisting network station forwards a data packet as bits and then attempts to decode the data packet, subsequently forwarding it as a complete packet if it is decodable; or
the at least one assisting network station attempts to decode a data packet and forwards the data packet as bits if it not decodable and as a complete packet if it is decodable.

8. A method according to claim 1, wherein
each network station forwards the data to each other network station.

9. A method according to claim 1, wherein
the data is only forwarded when it has a signal quality metric above a predetermined threshold.

10. A method in a wireless communication system comprising a user equipment, an anchor network station and at least on assisting network station, wherein
the user equipment simultaneously transmits the same data to the anchor and assisting network stations;
the anchor and assisting network station each receive the data and transmit an acknowledgement of the data to the user equipment in response; and
the at least one assisting network station also forwards the data to the anchor network station, wherein
a re-transmission process is used, in which each network station sends a positive acknowledgement if the data is decodable, or a negative acknowledgement if the data is not decodable, the negative acknowledgement acting as a request for re-transmission; and wherein
a predefined maximum number of re-transmissions sets a total process time available and data is only forwarded if the time remaining before the total process time elapses is longer than the time required for the data to be transmitted to the anchor network station.

11. A wireless communication system comprising a user equipment, an anchor network station and at least one assisting network station, wherein
the user equipment is configured to simultaneously transmit the same data to the anchor and assisting network stations;
the anchor and assisting network stations are each configured to receive the data and to transmit an acknowledgement of the data to the user equipment in response; and
the at least one assisting network station is preferably also configured to forward the data to the anchor network station, wherein
a re-transmission process is used, in which each network station sends a positive acknowledgement if the data is decodable, or a negative acknowledgement if the data is not decodable, the negative acknowledgment acting as a request for re-transmission; and wherein
a predetermined round trip time between sending the data in a first transmission and receiving an acknowledgment for the transmission does not allow sufficient time for the data forwarding, so that the forwarded data is to be combined in the anchor network station with data from the first transmission and at least one re-transmission from the user equipment to the anchor network station.

12. A user equipment for use in a wireless communication system comprising the user equipment, an anchor network station and at least one assisting network station, wherein
the user equipment is configured to simultaneously transmit the same data to the anchor and assisting network stations, and to receive in response an acknowledgement of the data from each of the anchor and assisting network stations, wherein
a re-transmission process is used, in which each network station sends a positive acknowledgement if the data is decodable, or a negative acknowledgement if the data is not decodable, the negative acknowledgement acting as a request for re-transmission; and wherein
a predetermined round trip between sending the data in a first transmission and receiving an acknowledgement for that transmission does not allow sufficient time for data forwarding from the at least one assisting network station to the anchor network station, so that forwarded data is to be combined in the anchor network station with data from the first transmission and at least one re-transmission from the user equipment to the anchor network station.

13. An anchor network station for use in a wireless communication system comprising a user equipment, the anchor network station and at least one assisting network station, wherein
the anchor network station is configured to:
receive data simultaneously transmitted from the user equipment to the anchor network station and the at least one assisting network station;
transmit an acknowledgement of the data to the user equipment in response;
receive the same data forwarded from the at least one assisting network station; and if the or one of the assisting network station decodes the data, to
receive an indication from the user equipment or the successful assisting network station that the data has been decoded, wherein
a re-transmission process is used, in which each network station sends a positive acknowledgment if the data is decodable, or a negative acknowledgment if the data is not decodable, the negative acknowledgement acting as a request for re-transmission; and wherein
a predetermined round trip time between sending the data in a first transmission and receiving an acknowledgement for that transmission does not allow sufficient time for the data forwarding, so that the forwarded data is to be combined in the anchor network station with data from the first transmission and at least one re-transmission from the user equipment to the anchor network station.

14. An assisting network station for use in a wireless communication system comprising a user equipment, an anchor network station and the assisting network station, wherein
the assisting network station is configured to receive data simultaneously transmitted to it and the anchor network station and to transmit an acknowledgement of the data to the user equipment in response; and wherein
the assisting network station is configured to forward the data to the anchor network station, wherein
a re-transmission process is used, in which each network station sends a positive acknowledgement if the data is decodable, or a negative acknowledgment if the data is not decodable, the negative acknowledgement acting as a request for re-transmission; and wherein a predetermined round trip time between sending the data in a first transmission and receiving an acknowledgement for that transmission does not allow sufficient time for the data forwarding, so that the forward data is to be combined in the anchor network station with data from the first transmission and at least one re-transmission from the user equipment to the anchor network station.

* * * * *